(12) United States Patent
Perepechko

(10) Patent No.: US 12,058,200 B1
(45) Date of Patent: Aug. 6, 2024

(54) SECURE FILE SHARING AND DELETION

(71) Applicant: Capital One Services, LLC, McLean, VA (US)

(72) Inventor: Alexander Perepechko, Bellevue, WA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/364,997

(22) Filed: Aug. 3, 2023

(51) Int. Cl.
*H04L 67/06* (2022.01)
*G06F 16/16* (2019.01)
*G06F 21/62* (2013.01)
*H04L 9/40* (2022.01)
*H04L 67/1097* (2022.01)

(52) U.S. Cl.
CPC .......... *H04L 67/06* (2013.01); *G06F 16/162* (2019.01); *G06F 21/6209* (2013.01); *H04L 63/0815* (2013.01); *H04L 63/101* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 10,037,352 | B1 * | 7/2018 | Dyer | G06F 16/282 |
| 10,783,269 | B1 * | 9/2020 | Shraer | H04L 9/3242 |
| 2014/0006354 | A1 * | 1/2014 | Parkison | G06F 3/0635 |
| | | | | 707/661 |

FOREIGN PATENT DOCUMENTS

EP    3081022 B1    1/2019

OTHER PUBLICATIONS

Yan et al., "FlashGhost: Data Sanitization with Privacy Protection Based on Frequent Colliding Hash Table", Sep. 20, 2019, IEEE, 2019 IEEE International Conference on Services Computing (SCC) (pp. 90-99) (Year: 2019).*
Aman Sharma, et al., "MLH-Fellowship/Chamber-of-Secrets," Github (Jun. 25, 2021), 3 pages.
Google Inc., "Share files from Google Drive" (retrieved May 31, 2023), 5 pages.
Justin Pot, "How to build your own Slack bot," Zapier Tutorials (Oct. 24, 2022), 18 pages.
Danny Coates, "Firefox Send," Github (May 22, 2021), 4 pages.
Steven Margolies, "Share a Virtru Secured File without Virtru Installed," Virtru (2022), 11 pages.

* cited by examiner

*Primary Examiner* — Davoud A Zand
(74) *Attorney, Agent, or Firm* — Harrity & Harrity, LLP

(57) ABSTRACT

In some implementations, a file sharer may receive, from a first user device, a file and an indication of a set of additional users and may perform encryption on the file to generate an encrypted file. The file sharer may transmit the encrypted file to a cloud storage. The file sharer may receive, from a second user device, a request for the file and may contact a single sign on service to authenticate a user of the second user device. The file sharer may verify that the user of the second user device is included in the set of additional users. The file sharer may receive the encrypted file from the cloud storage and may perform decryption on the encrypted file to generate a copy of the file. The file sharer may transmit, to the second user device, the copy of the file.

20 Claims, 14 Drawing Sheets

100 ⟶

SECURE FILE SHARING AND DELETION

BACKGROUND

Many cloud storages (e.g., Google Drive) allow users to share files with each other. Alternatively, one user may send an encrypted file to another user with file sharing software (e.g., Virtru®).

SUMMARY

Some implementations described herein relate to a system for securely sharing and deleting files. The system may include one or more memories and one or more processors communicatively coupled to the one or more memories. The one or more processors may be configured to receive, from a first user device, a file. The one or more processors may be configured to perform encryption on the file, based on a secret received from the first user device, to generate an encrypted file. The one or more processors may be configured to transmit the encrypted file to a cloud storage. The one or more processors may be configured to transmit, to the first user device, a link to the encrypted file. The one or more processors may be configured to receive, from the first user device, an indication of a set of additional users and an indication of an expiry time. The one or more processors may be configured to receive, from a second user device, a request for the file. The one or more processors may be configured to contact a single sign on (SSO) service to authenticate a user of the second user device. The one or more processors may be configured to verify that the user of the second user device is included in the set of additional users. The one or more processors may be configured to receive the encrypted file from the cloud storage. The one or more processors may be configured to perform decryption on the encrypted file to generate a copy of the file. The one or more processors may be configured to transmit, to the second user device, the copy of the file, based on verifying that the user of the second user device is included in the set of additional users. The one or more processors may be configured to determine that the expiry time has occurred. The one or more processors may be configured to transmit a command, to the cloud storage, to delete the encrypted file.

Some implementations described herein relate to a method of securely sharing and deleting files. The method may include receiving, from a first user device, a file. The method may include performing encryption on the file to generate an encrypted file. The method may include transmitting the encrypted file to a cloud storage. The method may include receiving, from the first user device, an indication of a set of additional users. The method may include receiving, from a second user device, a request for the file. The method may include contacting an SSO service to authenticate a user of the second user device. The method may include verifying that the user of the second user device is included in the set of additional users. The method may include receiving the encrypted file from the cloud storage. The method may include performing decryption on the encrypted file to generate a copy of the file. The method may include transmitting, to the second user device, the copy of the file, based on verifying that the user of the second user device is included in the set of additional users.

Some implementations described herein relate to a non-transitory computer-readable medium that stores a set of instructions for securely sharing and deleting files. The set of instructions, when executed by one or more processors of a device, may cause the device to receive, from a first user device, a file. The set of instructions, when executed by one or more processors of the device, may cause the device to perform encryption on the file, based on a secret received from the first user device, to generate an encrypted file. The set of instructions, when executed by one or more processors of the device, may cause the device to transmit the encrypted file to a cloud storage. The set of instructions, when executed by one or more processors of the device, may cause the device to transmit, to the first user device, a link to the encrypted file. The set of instructions, when executed by one or more processors of the device, may cause the device to receive, from the first user device, an indication of an expiry time. The set of instructions, when executed by one or more processors of the device, may cause the device to receive, from a second user device, a request for the file. The set of instructions, when executed by one or more processors of the device, may cause the device to verify that the second user device transmitted the request for the file via the link to the encrypted file. The set of instructions, when executed by one or more processors of the device, may cause the device to receive the encrypted file from the cloud storage. The set of instructions, when executed by one or more processors of the device, may cause the device to perform decryption on the encrypted file to generate a copy of the file. The set of instructions, when executed by one or more processors of the device, may cause the device to transmit, to the second user device, the copy of the file, based on verifying that the second user device transmitted the request via the link. The set of instructions, when executed by one or more processors of the device, may cause the device to determine that the expiry time has occurred. The set of instructions, when executed by one or more processors of the device, may cause the device to transmit a command, to the cloud storage, to delete the encrypted file.

DETAILED DESCRIPTION

The following detailed description of example implementations refers to the accompanying drawings. The same reference numbers in different drawings may identify the same or similar elements.

Sharing a file with other users is often insecure. For example, an email message with an attached file may be intercepted and read. Additionally, sharing a file involves memory overhead. For example, an email message with an attached file is separately stored at each user device or is at least stored separately across multiple email servers (e.g., for each email account that received the email message). In order to improve security and reduce overhead, cloud storages allow for sharing a file without storing separate copies across user devices and/or email servers.

However, cloud storages remain insecure because cloud storages are custodial. In other words, even if a cloud storage encrypts an uploaded file so that an intruder cannot read the encrypted file, the cloud storage retains the ability to decrypt the file. As a result, a bad employee of the cloud storage or another bad actor that obtains a decryption key used by the cloud storage can steal and read the uploaded file. End-to-end encryption between user devices is more secure than custodial cloud storage, but end-to-end encryption re-introduces the memory overhead problem of sharing files via email messages.

Some implementations described herein enable independent encryption of a file that is shared via a cloud storage. As a result, memory overhead is reduced as compared with directly sharing files (e.g., via email messages and/or end-to-end encryption), and security is improved as compared with using custodial cloud storages because the cloud storage is unable to decrypt the shared file. The encryption may be performed by a file sharer that is local to user devices or that is cloud-implemented separately from the cloud storage. The file sharer may further increase security by implementing automatic deletion of the shared file. Because the automatic deletion is handled separately from the cloud storage, a bad actor with access to the cloud storage cannot halt deletion, and a bad actor that halts deletion from the file sharer is still unable to decrypt the shared file. Additionally, or alternatively, the file sharer may further increase security by verification of users via a single sign on (SSO) service. Because the SSO service is accessed separately from the cloud storage, a bad actor with access to the cloud storage cannot modify a response from the SSO service in order to gain access to the shared file.

FIGS. 1A-1F are diagrams of an example 100 associated with secure file sharing and deletion. As shown in FIGS. 1A-1F, example 100 includes a first user device, a file sharer, a second user device, a cloud storage, a cloud database, and an SSO service. These devices are described in more detail in connection with FIGS. 3 and 4.

Figure 1A:
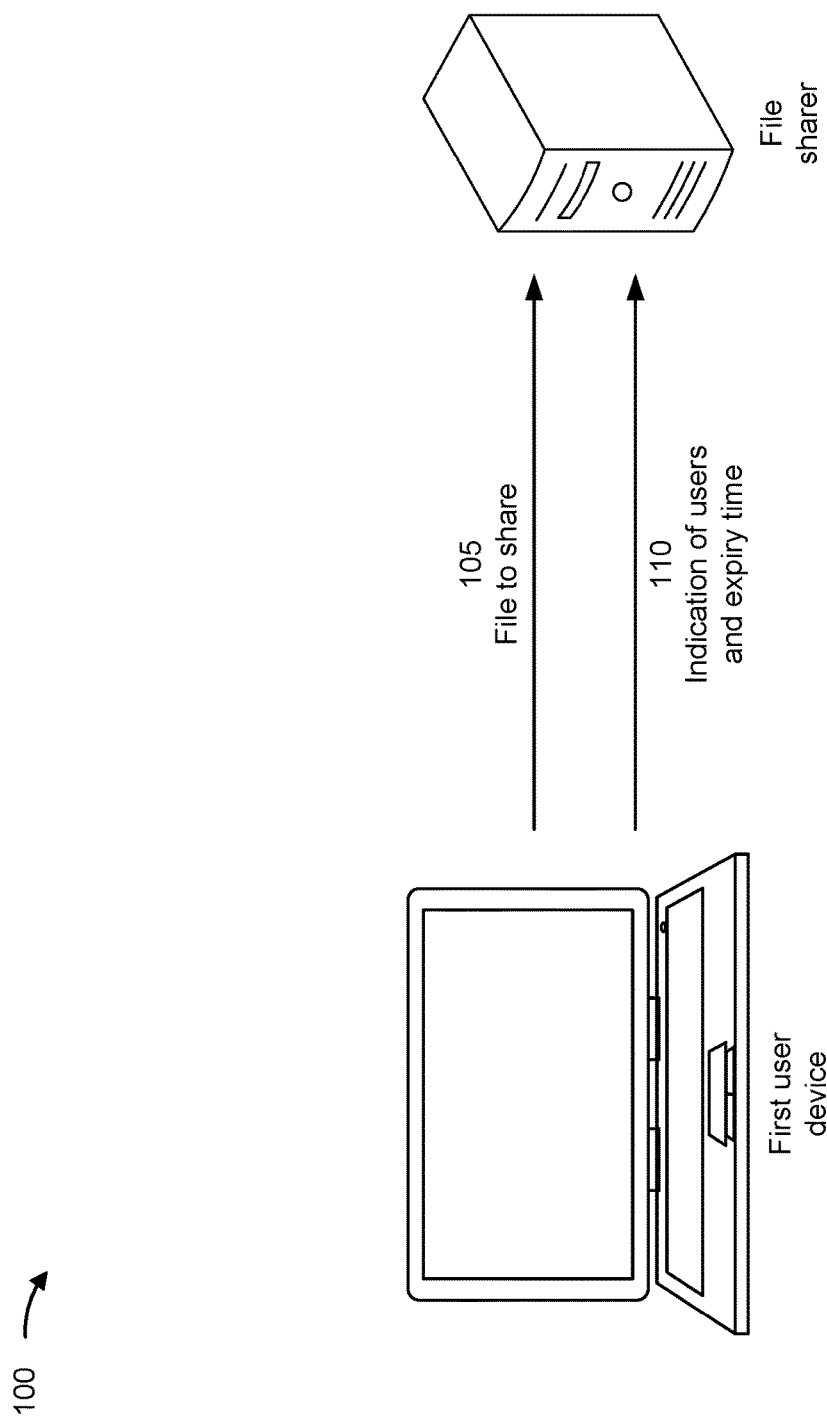
FIGS. 1A-1F are diagrams of an example implementation relating to secure file sharing and deletion, in accordance with some embodiments of the present disclosure.

As shown in FIG. 1A and by reference number 105, the first user device may transmit, and the file sharer may receive, a file. For example, the file sharer may be local to the first user device (e.g., the file sharer includes software that is executed by the first user device), and the first user device may indicate a file path associated with the file to the file sharer. Accordingly, the file sharer may receive (at a least a portion of) the file in a memory accessible by the file sharer (e.g., controlled by the first user device or at least accessible by the first user device). In some implementations, a user of the first user device may interact with a user interface (UI) (e.g., using an input component, such as a touchscreen, a mouse, a keyboard, or a microphone) in order to instruct the first user device to indicate the file path to the file sharer.

Alternatively, the file sharer may be cloud-implemented (e.g., the file sharer includes software that is executed in a cloud environment), and the first user device may upload the file to the cloud environment. In some implementations, the user of the first user device may interact with a UI (e.g., using an input component, such as a touchscreen, a mouse, a keyboard, or a microphone) generated by a web browser (or another similar software program executed by the first user device) in order to instruct the first user device to navigate to a website managed by (or at least associated with) the file sharer. Therefore, the user of the first user device may interact with the website in order to instruct the first user device to upload the file to the file sharer.

As shown by reference number 110, the first user device may transmit, and the file sharer may receive, an indication of a set of additional users and an indication of an expiry time. For example, the set of additional users may indicate which users are allowed to access the file. The expiry time may include an amount of time (e.g., 8 hours, 4 days, 1 week, or 1 month, among other examples) or may include a datetime (e.g., 4:30 pm Eastern Standard Time on Aug. 7, 2023). In some implementations, the user of the first user device may interact with a UI (e.g., using an input component, such as a touchscreen, a mouse, a keyboard, or a microphone) in order to instruct the first user device to indicate the set of additional users and/or the expiry time to the file sharer.

In some implementations, the file is included in a single message with the indication of the set of additional users and/or the indication of the expiry time. For example, the first user device may transmit the message to the file sharer because the file sharer is remote from the first user device (e.g., executed in a cloud environment or another type of remote device). In another example, the user of the first user device may interact with a confirmation button (or another type of UI element) in order to instruct the first user device to move (at a least a portion of) the file, in combination with the indication of the set of additional users and/or the indication of the expiry time, into a memory accessible by the file sharer because the file sharer is local to the first user device.

Figure 1B:
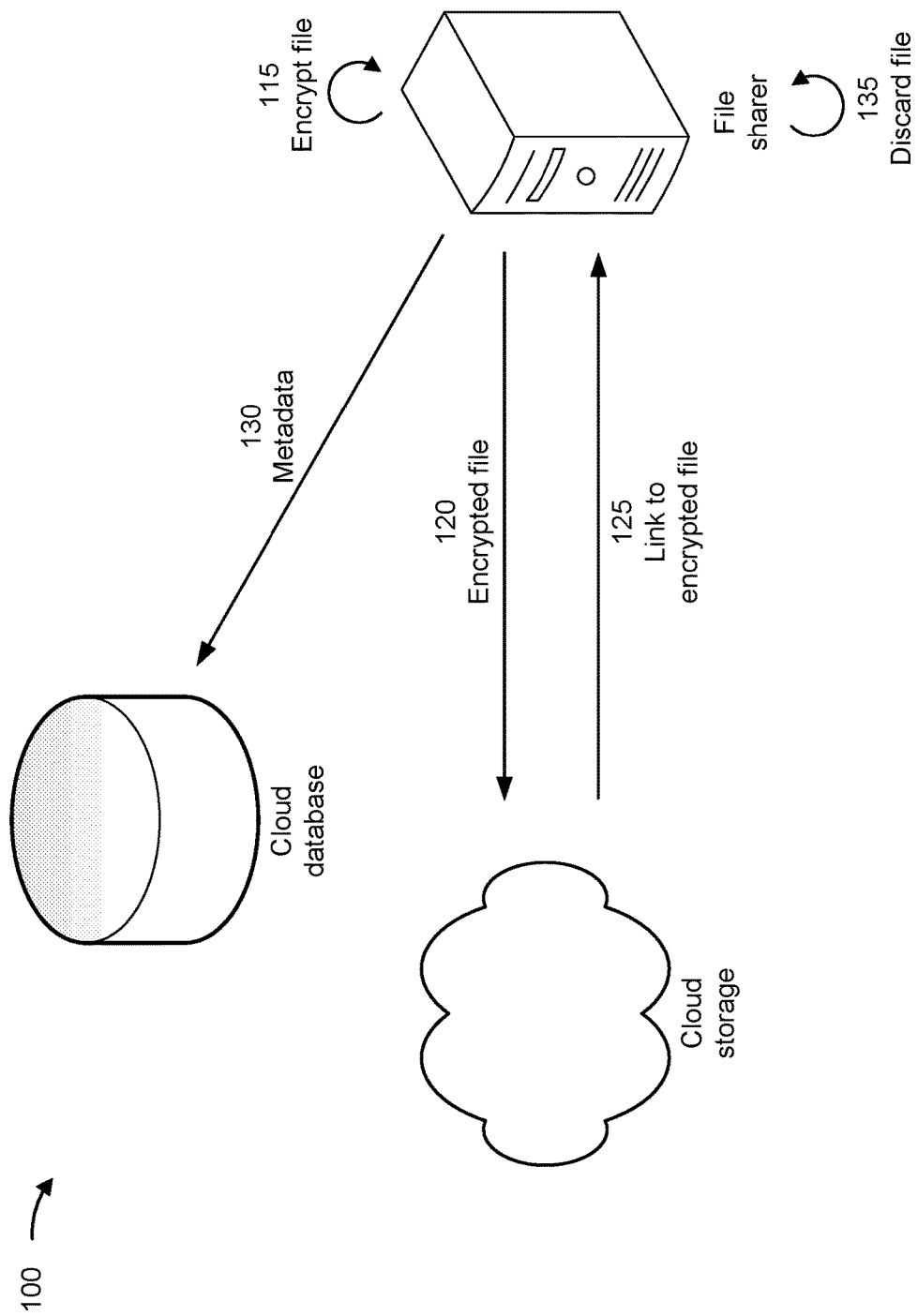

As shown in FIG. 1B and by reference number 115, the file sharer may perform encryption on the file to generate an encrypted file. The file sharer may use a password, a private key, or another type of information used to convert the file from plaintext into ciphertext. The file sharer may receive a private key from a key distribution center (KDC) or may select the private key from a plurality of possible keys stored in a memory accessible by the file sharer. For example, the selection may be random (or at least quasi-random based on pseudo-random number generation) in order to improve security. Alternatively, in order to provide for customizability, the file sharer may use a secret received from the first user device, as described in connection with FIG. 2B.

As shown by reference number 120, the file sharer may transmit the encrypted file to the cloud storage. For example, the file sharer may transmit a message (e.g., a hypertext transfer protocol (HTTP) message or a file transfer protocol (FTP) message) including the file in a body of the message and/or may perform a call to an application programming interface (API) function including the file as a parameter. The file sharer may use a uniform resource locator (URL) and/or an Internet protocol (IP) address associated with the cloud storage to address the encrypted file to the cloud storage.

In some implementations, as shown by reference number 125, the cloud storage may transmit, and the file sharer may receive, a link to the encrypted file. For example, the link may include a URL or another type of hyperlink that directs to the cloud storage (and to the encrypted file more particularly). Additionally, or alternatively, as described in connection with FIG. 2B, the cloud storage may generate a link to the encrypted file. For example, the link may include a URL or another type of hyperlink that directs to the file sharer (which, in turn, retrieves the encrypted file from the cloud storage).

As shown by reference number 130, the file sharer may transmit, and the cloud database may receive, metadata associated with the encrypted file. The metadata may indicate a file name associated with the encrypted file, the link to the encrypted file (e.g., provided by the cloud storage and/or generated by the file sharer), a size associated with the encrypted file, a creation datetime associated with the encrypted file, the expiry time, and/or the set of additional users, among other examples. Accordingly, the file sharer improves security by storing the metadata separately from the file sharer and the cloud storage. Additionally, the file sharer reduces memory overhead at the first user device (for a local implementation) or at a remote device (for a remote implementation).

As shown by reference number 135, the file sharer may discard the file after generating the encrypted file. Therefore, security is improved because the file sharer does not retain an unencrypted copy of the file that could be stolen and read.

Figure 1C:
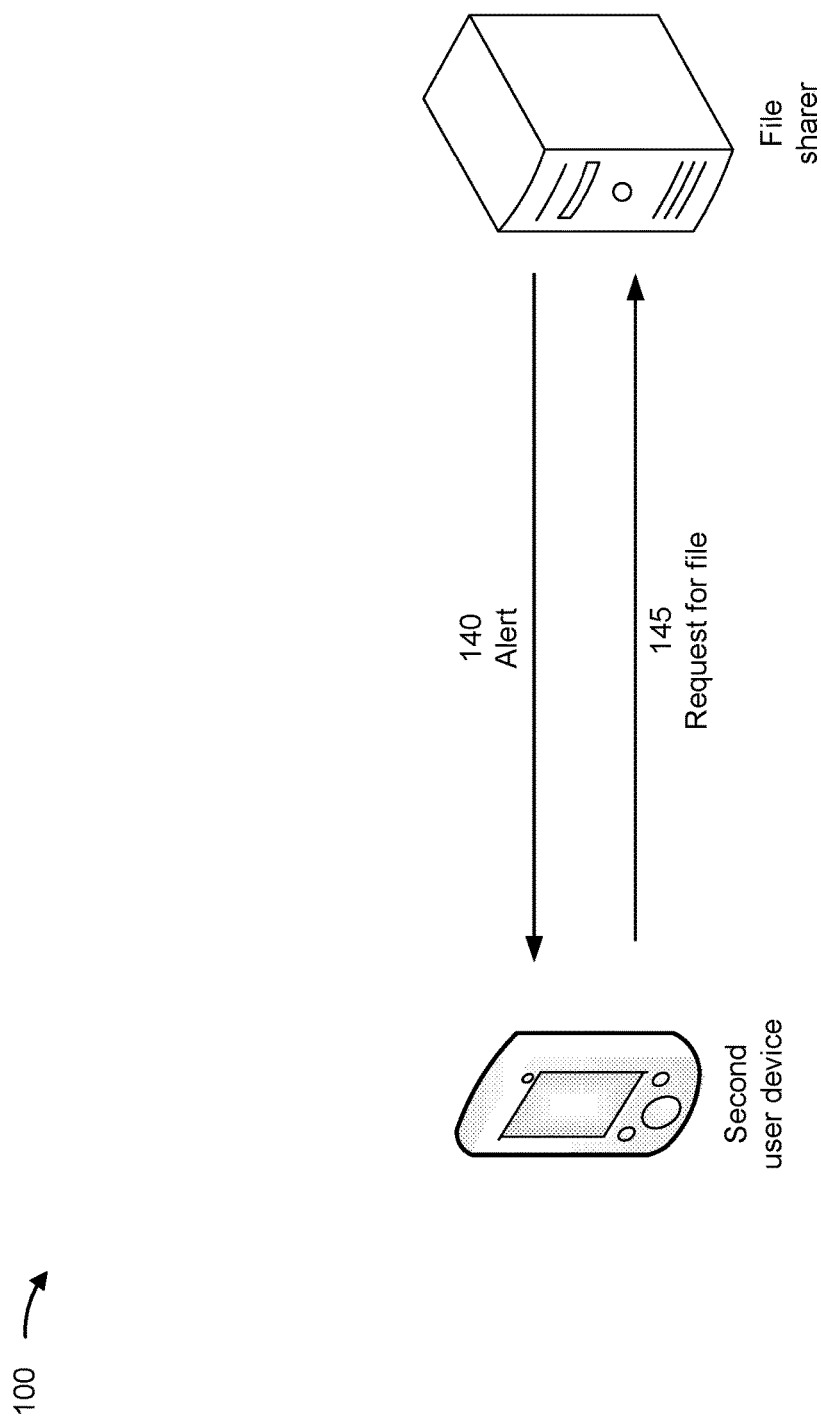

As shown in FIG. 1C and by reference number 140, the file sharer may transmit, and the second user device may receive, an alert (e.g., an email message, a text message, a chat message, a push notification, or a pop-up window, among other examples). The file sharer may select the second user device because the second user device is associated with a user included in the set of additional users. For example, the file sharer may map an indication included in the set of additional users (e.g., a name or a username, among other examples) to an indication of the second user device (e.g., an email address, a phone number, or a device name, among other examples) using a data structure that links (e.g., provided by the SSO service or otherwise available to the file sharer). Additionally, or alternatively, the first user device may transmit an indication of the second user device in addition to, or as at least a portion of, the indication of the set of additional users.

The alert may include text indicating that the file has been shared with the user of the second user device. Additionally, or alternatively, the alert may include the link to the encrypted file. In some implementations, the file sharer may generate a shorter version of the link to the encrypted file, which was provided by the cloud storage, to include in the alert. For example, the file sharer may use a third-party link shortener or may use an internal link shortener provided by, or at least associated with, the SSO service.

Additionally, or alternatively, the file sharer may transmit the link to the encrypted file to the first user device. Accordingly, the first user device may transmit the link to the second user device, as described in connection with FIG. 2C.

As shown by reference number 145, the second user device may transmit, and the file sharer may receive, a request for the file. For example, the second user device may transmit a message (e.g., an HTTP message or an FTP message) indicating the file (e.g., in a body and/or in a header of the message) and/or may perform a call to an API function and indicate the file in a parameter. In some implementations, the second user device may use the link included in the alert (e.g., by resolving the link) to transmit the request. Accordingly, as shown in FIG. 1C, the file sharer may receive the request for the file based on the link that was provided. Alternatively, the link may direct the second user device directly to the cloud storage such that the second user device instructs the file sharer to perform authentication and decryption (e.g., as described in connection with FIGS. 1D and 1E) after receiving a copy of the encrypted file.

Figure 1D:
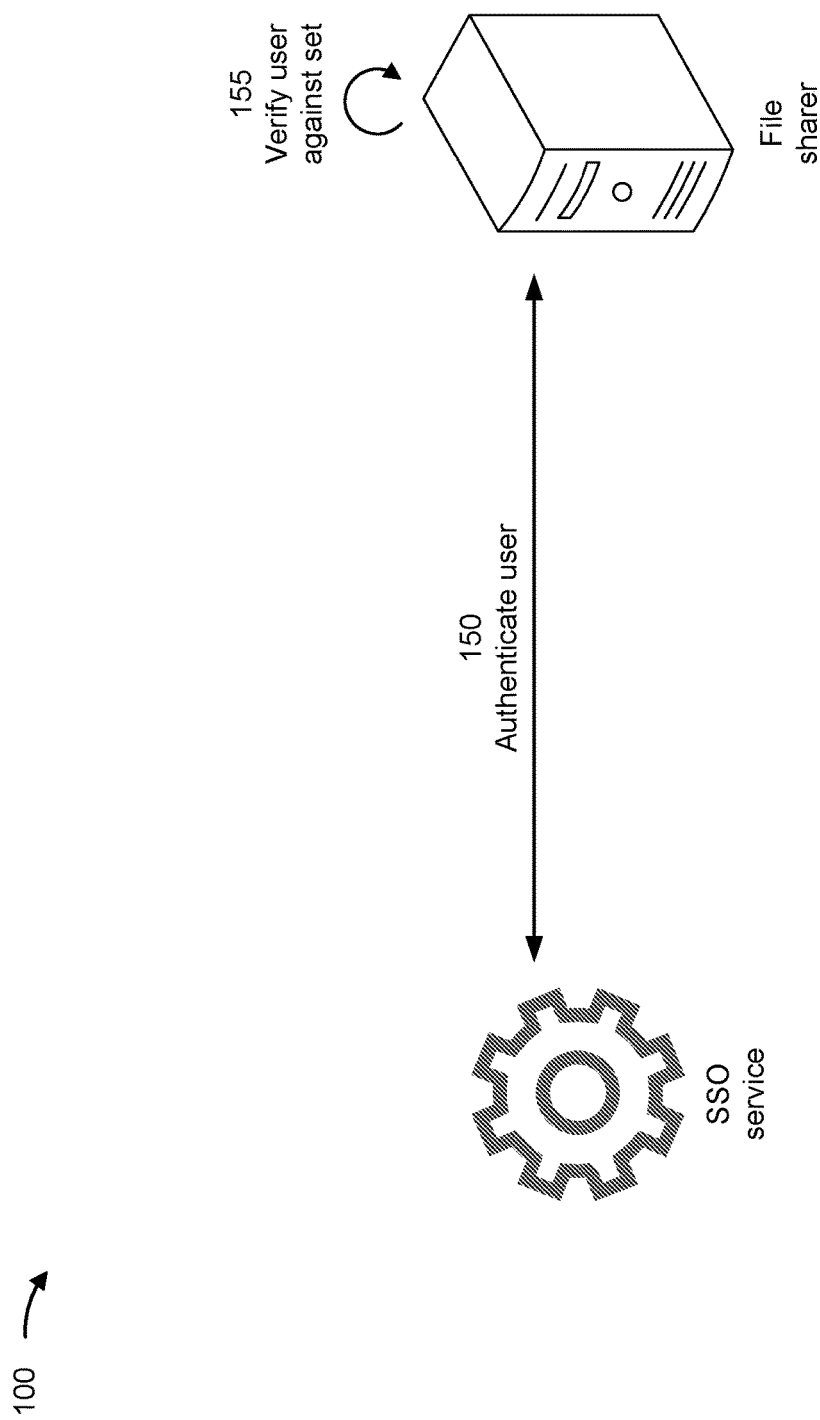

As shown in FIG. 1D and by reference number 150, the file sharer may contact an SSO service to authenticate a user of the second user device. In some implementations, the file sharer may verify a secret provided by the second user device (e.g., a token, a certificate, a signature, a key, or another type of information that can authenticate a user) using the SSO service. For example, the file sharer may transmit a message (e.g., an HTTP message) including the secret and/or perform a call to an API function including the secret as a parameter, and the file sharer may receive from the SSO service an indication of whether the user is authenticated (e.g., a Boolean or another type of binary indicator). Using the SSO service improves security because a bad actor has to trick both the file sharer and the SSO service to access the file.

As shown by reference number 155, the file sharer may verify that the user of the second user device is included in the set of additional users. For example, the file sharer may determine that a username, associated with the user, is included on a list of usernames associated with the set of additional users. In another example, the file sharer may determine that an email address, associated with the user, is included on a list of email addresses associated with the set of additional users. Other verifications may include determining that a phone number, associated with the user, is included on a list of phone numbers associated with the set of additional users; determining that a device name, associated with the second user device, is included on a list of device names associated with the set of additional users; determining that an IP address, associated with the second user device, is included on a list of IP addresses associated with the set of additional users; or determining that a medium access control (MAC) address, associated with the second user device, is included on a list of MAC addresses associated with the set of additional users, among other examples. In some implementations, the file sharer may transmit a request for the set of additional users, to the cloud database, in response to receiving the request for the file and may receive, from the cloud database, an indication of the set of additional users in response to the request for the set of additional users. Verifying the user against the set of additional users, in combination with the SSO service, improves security because the user is verified twice before receiving the file.

In some implementations, the file sharer may refrain from verifying the user of the second user device against the set of additional users. For example, as shown in FIGS. 2C and 2D, any user with the link to the encrypted file may be authorized to access the file. Therefore, the first user device may refrain from transmitting the indication of the set of additional users.

Figure 1E:
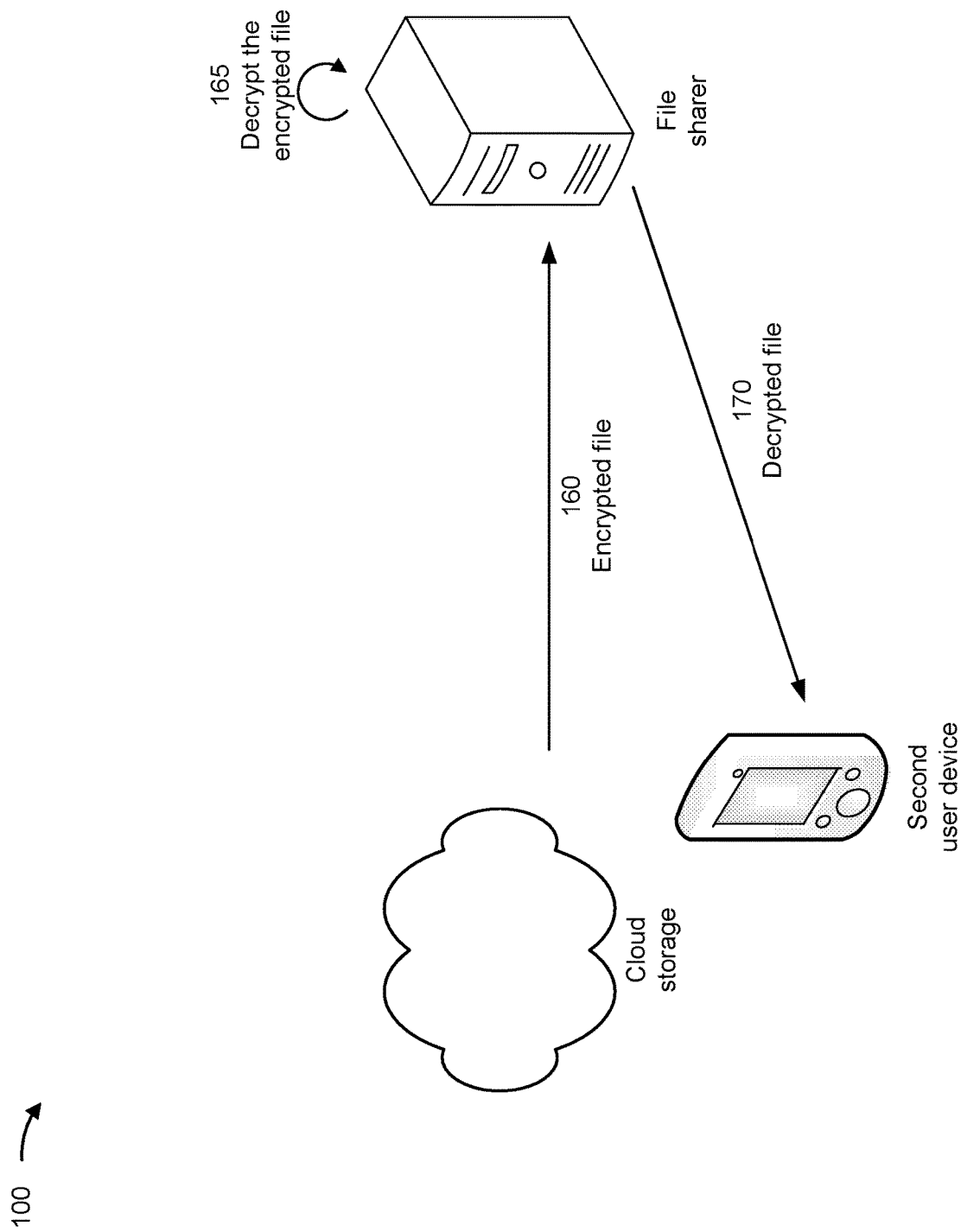

As shown in FIG. 1E and by reference number 160, the cloud storage may transmit, and the file sharer may receive, the encrypted file. For example, the file sharer may retrieve the encrypted file using the link provided by the cloud storage (e.g., as described in connection with reference number 125). Additionally, or alternatively, the file sharer may receive the encrypted file in response to transmitting a message (e.g., an HTTP request) that indicates the file (e.g., including a file name or another type of indication in a header or in a body of the message) or in response to calling an API function and indicating the file in a parameter (e.g., using a file name or another type of indication). In some implementations, the file sharer may request the encrypted file based on authenticating the user (with the SSO service) and/or verifying the user (against the set of additional users).

As shown by reference number 165, the file sharer may perform decryption on the encrypted file to generate a copy of the file. The file sharer may convert the encrypted file from ciphertext into plaintext. In remote implementations, the file sharer may directly access a secret for decrypting the encrypted file. In local implementations, the file sharer may transmit the secret for decrypting the encrypted file from a first local instance executed by the first user device and to a second local instance executed by the second user device. For example, the secret may be included in the alert or in a separate message from the first user device to the second user device.

As shown by reference number 170, the file sharer may transmit, and the second user device may receive, the copy of the file. For example, the file sharer may transmit the copy of the file based on authenticating the user (with the SSO service) and/or verifying the user (against the set of additional users). The copy of the file may be included in a message (e.g., an HTTP message) and/or transmitted as a return to a call, performed by the second user device, to an API function associated with the file sharer.

In remote implementations, the file sharer may transmit the copy of the file using a network (e.g., at least one network). In local implementations, the file sharer may store the copy of the file in a memory of the second user device. For example, the file sharer may save the copy of the file in a solid state drive (SSD) or another type of hard drive from a random access memory (RAM) or another type of temporary storage.

In some implementations, the file sharer may discard the copy of the file after transmitting the copy to the second user device. Therefore, security is improved because the file sharer does not retain an unencrypted copy of the file that could be stolen and read.

Figure 1F:
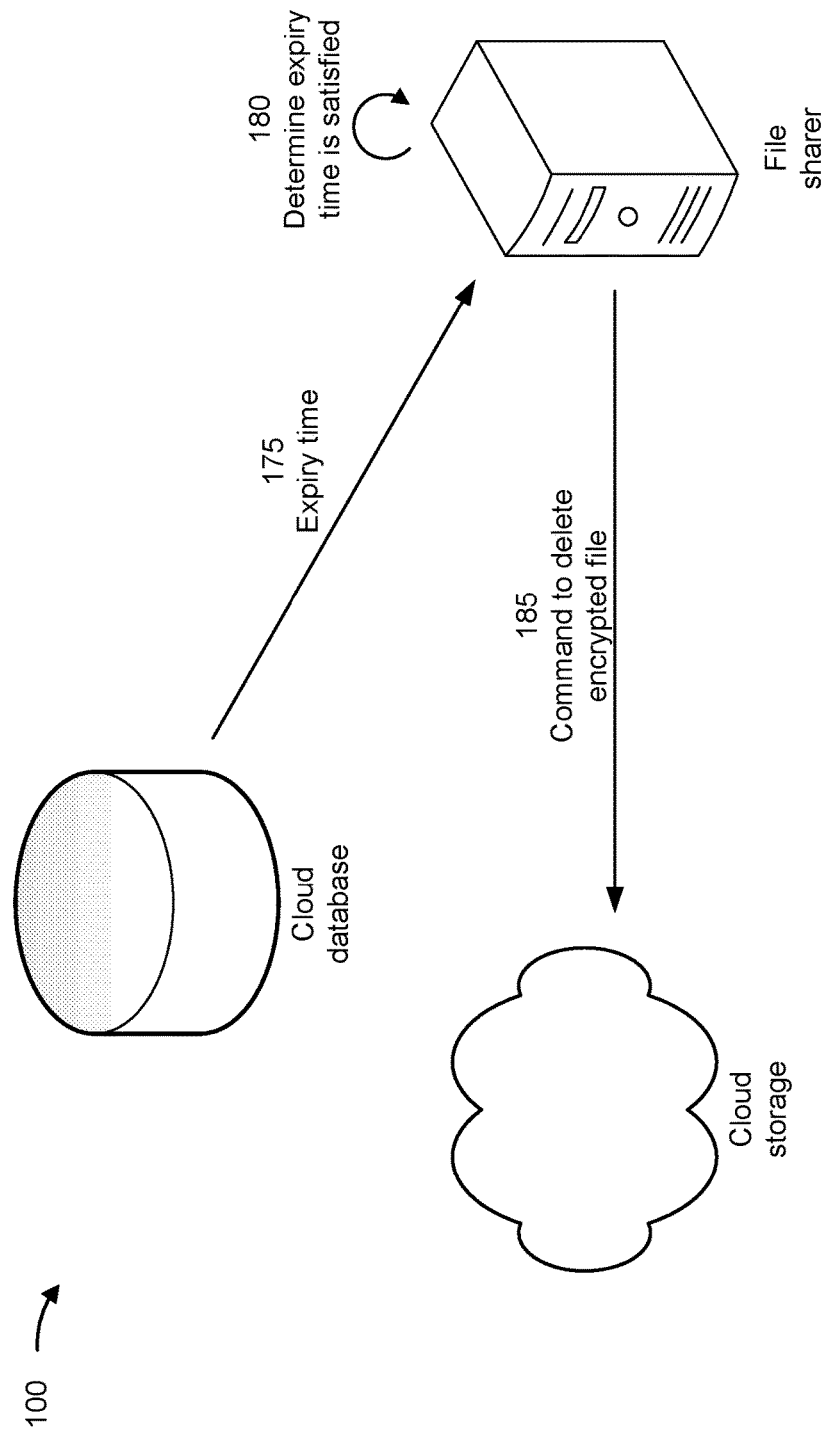

As shown in FIG. 1F and by reference number 175, the cloud database may transmit, and the file sharer may receive, an indication of the expiry time. For example, the file sharer may transmit a request for the expiry time to the cloud database and may receive, from the cloud database, the indication of the expiry time in response to the request for the expiry time. The file sharer may transmit the request periodically (e.g., according to a schedule) and/or in response to a command from an administrator associated with the file sharer. Thus, the file sharer may pull expiry times from the cloud database. In another example, the cloud database may transmit the indication of the expiry time automatically (e.g., periodically and/or in response to detecting that the expiry time has occurred). Thus, the cloud database may push expiry times to the file sharer.

As shown by reference number 180, the file sharer may determine that the expiry time has occurred. For example, the expiry time may include an amount of time that functions as a threshold, and the file sharer may determine that an amount of time between a datetime associated with upload of the file and a current datetime satisfies the threshold. In another example, the expiry time may include a datetime, and the file sharer may determine that the datetime in the expiry time is in the past relative to a current datetime.

As shown by reference number 185, the file sharer may transmit, and the cloud storage may receive, a command to delete the encrypted file. For example, the file sharer may transmit a message (e.g., an HTTP message or an FTP message) indicating the command (e.g., in a body and/or in a header) and/or may perform a call to an API function that causes the cloud storage to delete the encrypted file. The command may be included in a set of commands that are based on a set of expiry times in the cloud database that have occurred. Accordingly, the file sharer may delete encrypted files in batches rather than individually.

Additionally, or alternatively, the file sharer may terminate access to the file in response to determining that the expiry time has occurred, as described in connection with FIG. 2E. In a combinatory example, the file sharer may terminate access in response to an initial request from a third user device after the expiry time has occurred and may transmit the command after terminating access.

By using techniques as described in connection with FIGS. 1A-1F, the file sharer encrypts the file independently of the cloud storage. As a result, memory overhead is reduced as compared with directly sharing files between the first user device and the second user device, and security is improved as compared with using custodial cloud storages because the cloud storage is unable to decrypt the encrypted file. The file sharer further increases security by implementing automatic deletion of the encrypted file. Because the automatic deletion is handled separately from the cloud storage, a bad actor with access to the cloud storage cannot halt deletion, and a bad actor that halts deletion from the file sharer is still unable to decrypt the encrypted file. Additionally, the file sharer further increases security by authenticating the user of the second user device via the SSO service. Because the SSO service is accessed separately from the cloud storage, a bad actor with access to the cloud storage cannot modify a response from the SSO service in order to gain access to the encrypted file.

As indicated above, FIGS. 1A-1F are provided as an example. Other examples may differ from what is described with regard to FIGS. 1A-1F. For example, the first user device may refrain from transmitting an indication of an expiry time. As a result, the file sharer may retain the encrypted file in the cloud storage until receiving a command to remove the file (e.g., from the first user device or from another device used by an owner of the encrypted file). Additionally, or alternatively, the file sharer may use encryption by the cloud storage in combination with the file sharer's own encryption. For example, the cloud storage may apply its own encryption to the uploaded file such that the file is double-encrypted while stored on the cloud storage. Accordingly, both the cloud storage and the file sharer perform decryption before delivering the file to the second user device. Additionally, or alternatively, the file sharer may use authentication by the cloud storage in combination with the file sharer's own authentication. For example, the cloud storage may authenticate the user of the second user device before delivering a copy of the encrypted file. Accordingly, both the cloud storage and the file sharer perform authentication before the file is received by the second user device.

FIGS. 2A-2E are diagrams of an example 200 associated with secure file sharing and deletion. As shown in FIGS. 2A-2E, example 200 includes a first user device, a file sharer, a second user device, a cloud storage, a third user device, a cloud database, and an SSO service. These devices are described in more detail in connection with FIGS. 3 and 4.

Figure 2A:
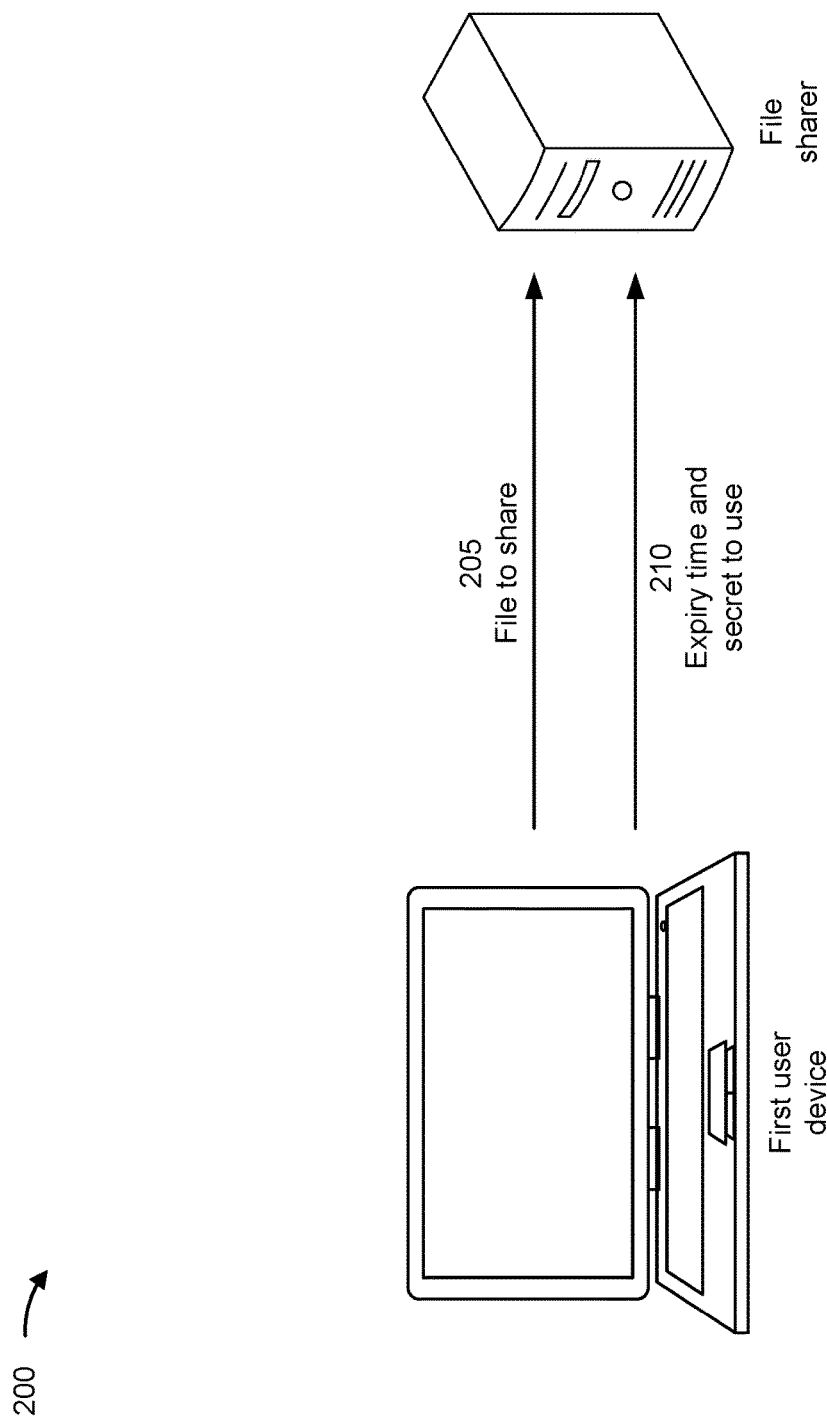
FIGS. 2A-2E are diagrams of an example implementation relating to secure file sharing and deletion, in accordance with some embodiments of the present disclosure.

As shown in FIG. 2A and by reference number 205, the first user device may transmit, and the file sharer may receive, a file. The file sharer may receive the file as described in connection with reference number 105 of FIG. 1A.

As shown by reference number 210, the first user device may transmit, and the file sharer may receive, an indication of a secret to use and an indication of an expiry time. The secret may include a password, a private key, or another piece of information that may be used to encrypt the file. The expiry time may include an amount of time (e.g., 8 hours, 4 days, 1 week, or 1 month, among other examples) or may include a datetime (e.g., 4:30 pm Eastern Standard Time on Aug. 7, 2023). In some implementations, the user of the first user device may interact with a UI (e.g., using an input component, such as a touchscreen, a mouse, a keyboard, or a microphone) in order to instruct the first user device to indicate the secret and/or the expiry time to the file sharer.

In some implementations, the file is included in a single message with the indication of the secret and/or the indication of the expiry time. For example, the first user device may transmit the message to the file sharer because the file sharer is remote from the first user device (e.g., executed in a cloud environment or another type of remote device). In another example, the user of the first user device may interact with a confirmation button (or another type of UI element) in order to instruct the first user device to move (at a least a portion of) the file, in combination with the indication of the secret and/or the indication of the expiry time, into a memory accessible by the file sharer because the file sharer is local to the first user device.

Figure 2B:
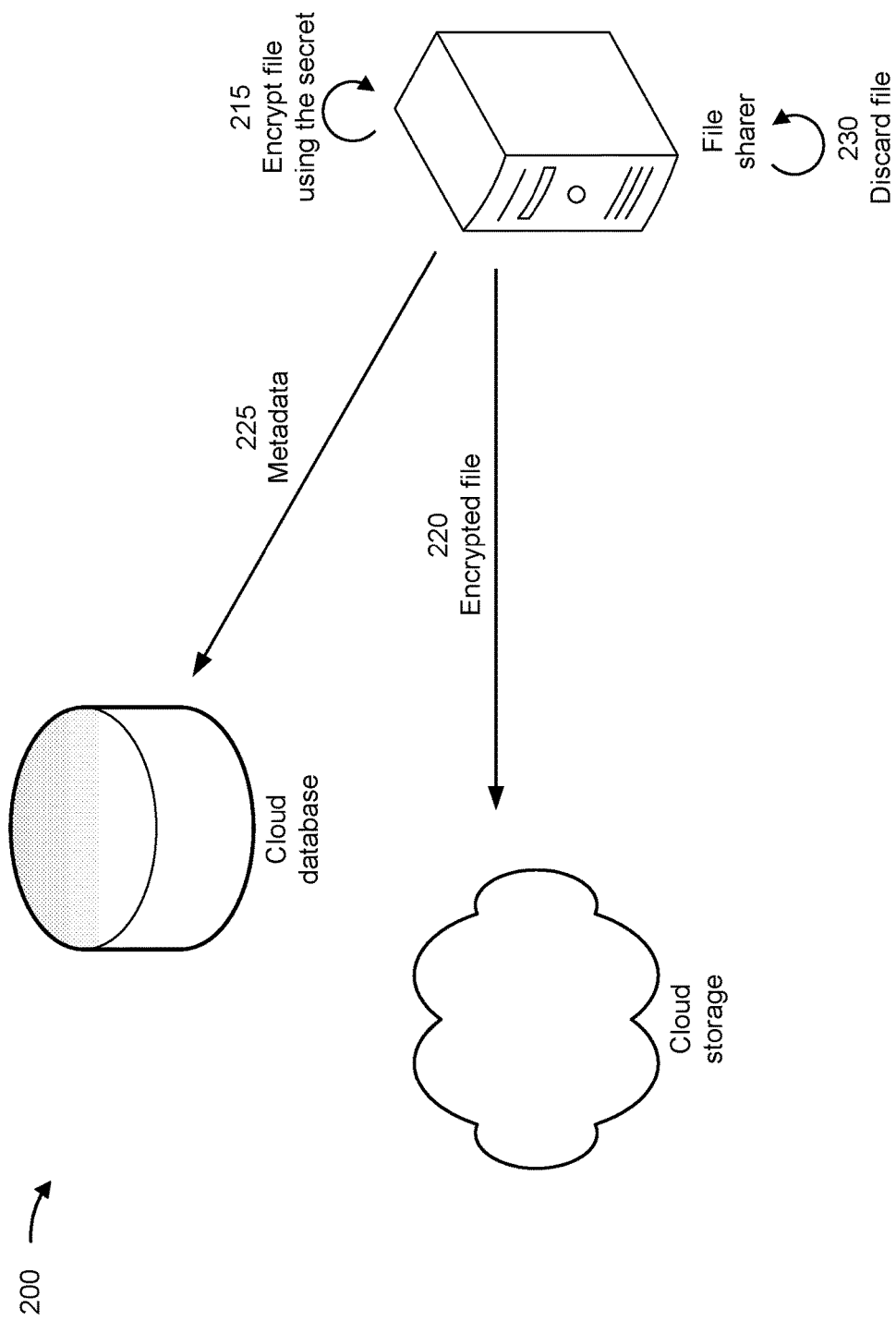
Figure 2C:
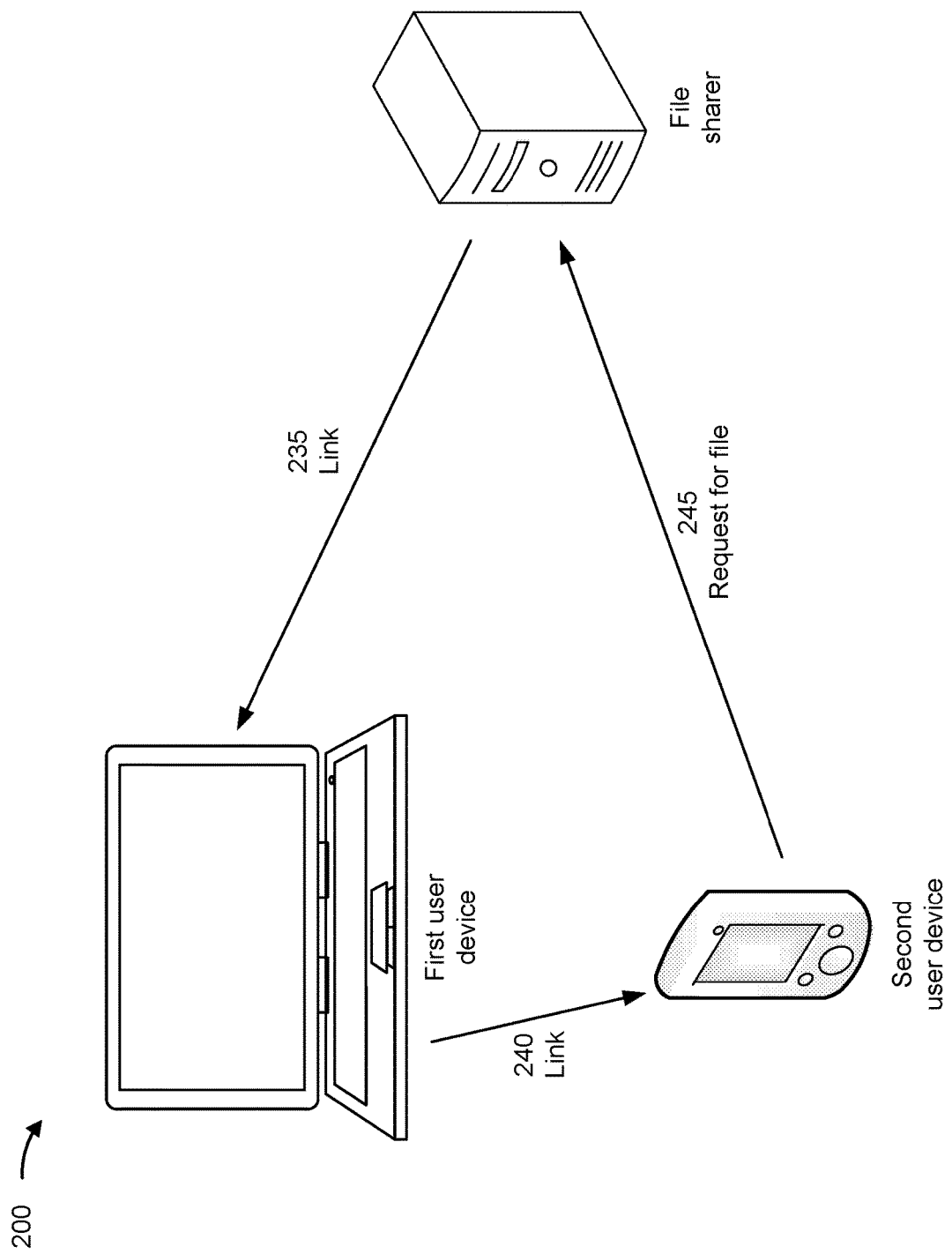
Figure 2D:
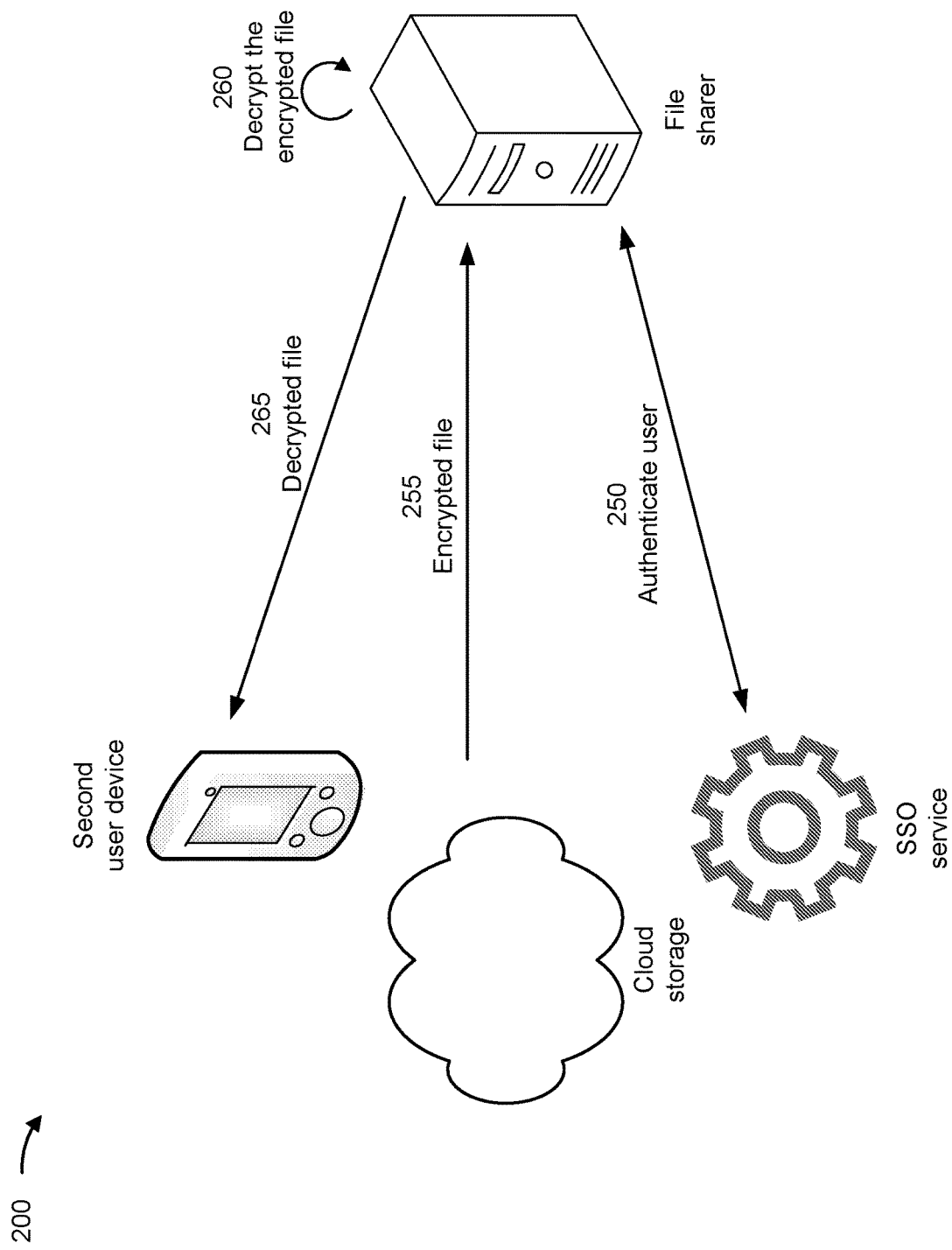

As shown in FIG. 2B and by reference number 215, the file sharer may perform encryption on the file, based on the secret received from the first user device, to generate an encrypted file. Alternatively, the file sharer may select a password, a private key, or another type of information used to convert the file from plaintext into ciphertext, as described in connection with FIG. 1B.

As shown by reference number 220, the file sharer may transmit the encrypted file to the cloud storage. For example, the file sharer may transmit the encrypted file as described in connection with reference number 120 of FIG. 1B.

In some implementations, the cloud storage may generate a link to the encrypted file. For example, the link may include a URL or another type of hyperlink that directs to the file sharer (which, in turn, retrieves the encrypted file from the cloud storage). Additionally, or alternatively, as described in connection with FIG. 1B, the cloud storage may transmit, and the file sharer may receive, a link to the encrypted file. For example, the link may include a URL or another type of hyperlink that directs to the cloud storage (and to the encrypted file more particularly).

As shown by reference number 225, the file sharer may transmit, and the cloud database may receive, metadata associated with the encrypted file. For example, the file sharer may transmit the metadata as described in connection with reference number 130 of FIG. 1B.

As shown by reference number 230, the file sharer may discard the file after generating the encrypted file. Therefore, security is improved because the file sharer does not retain an unencrypted copy of the file that could be stolen and read.

As shown in FIG. 2C and by reference number 235, the file sharer may transmit, and the first user device may receive, the link to the encrypted file. In some implementations, the file sharer may generate a shorter version of the link to the encrypted file, which was provided by the cloud storage, to transmit to the first user device. For example, the file sharer may use a third-party link shortener or may use an internal link shortener provided by, or at least associated with, the SSO service.

As shown by reference number 240, the first user device may transmit, and the second user device may receive, the link to the encrypted file. In some implementations, the user of the first user device may interact with a UI (e.g., using an input component, such as a touchscreen, a mouse, a keyboard, or a microphone) in order to instruct the first user device to transmit the link to the second user device. For example, the first user device may transmit a message that includes the link, such as an email message, a text message, or a chat message, among other examples. Additionally, or alternatively, the file sharer may transmit an alert to the second user device, as described in connection with FIG. 1C. For example, the alert may include the link to the encrypted file.

As shown by reference number 245, the second user device may transmit, and the file sharer may receive, a request for the file. For example, the file sharer may receive the request for the file as described in connection with reference number 145 of FIG. 1C.

As shown in FIG. 2D and by reference number 250, the file sharer may contact an SSO service to authenticate a user of the second user device. For example, the file sharer may authenticate the user as described in connection with reference number 150 of FIG. 1D. In some implementations, the file sharer may additional verify the user of the second user device against a set of additional users, indicated by the first user device, as described in connection with reference number 155 of FIG. 1D.

As shown by reference number 255, the clouds storage may transmit, and the file sharer may receive, the encrypted file. For example, the file sharer may receive the encrypted file as described in connection with reference number 160 of FIG. 1E.

As shown by reference number 260, the file sharer may perform decryption on the encrypted file to generate a copy of the file. For example, the file sharer may decrypt the encrypted file as described in connection with reference number 165 of FIG. 1E.

As shown by reference number 265, the file sharer may transmit, and the second user device may receive, the copy of the file. For example, the file sharer may transmit the copy of the file as described in connection with reference number 170 of FIG. 1E.

Figure 2E:
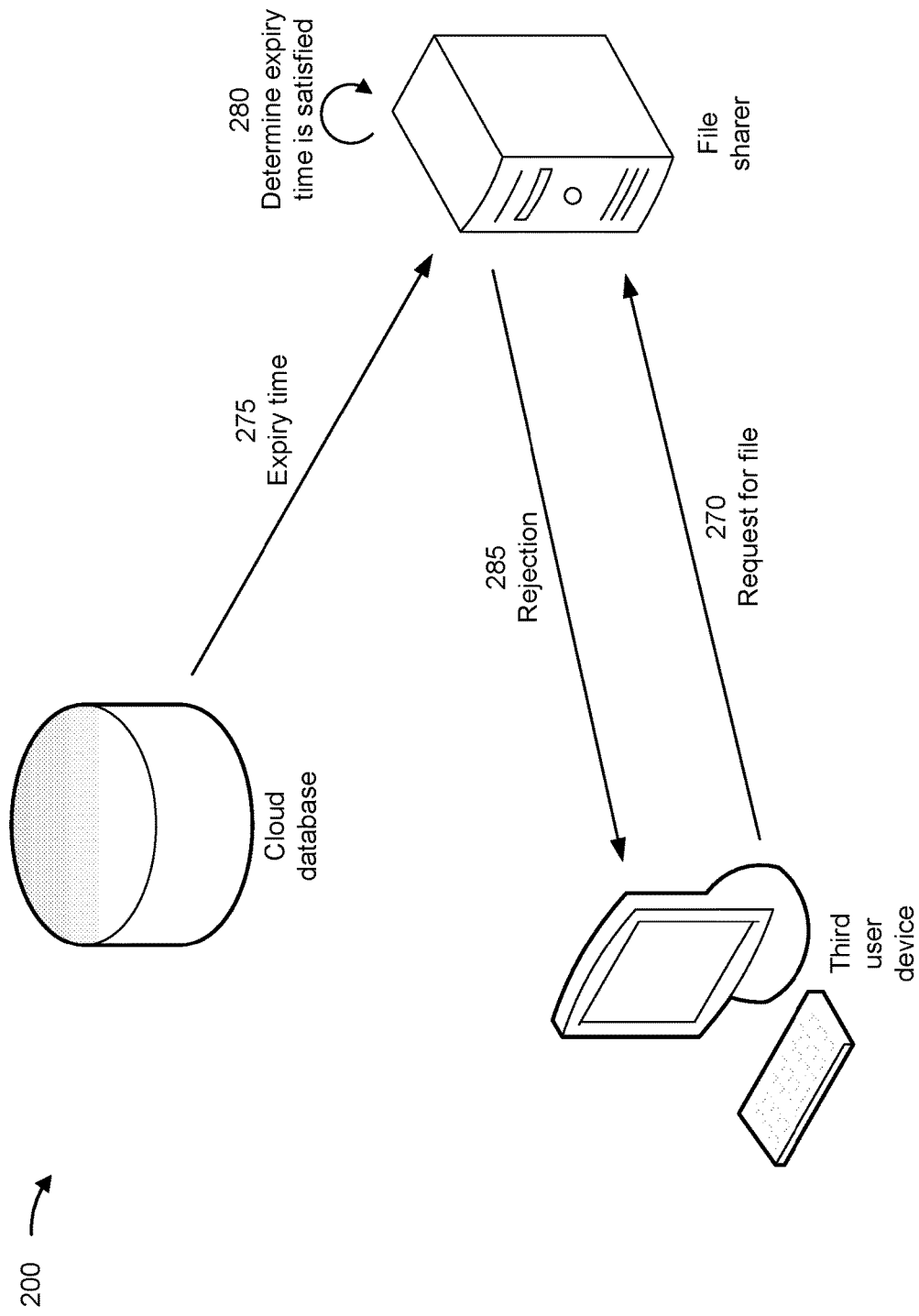

As shown in FIG. 2E and by reference number 270, the third user device may transmit, and the file sharer may receive, a request for the file. For example, the third user device may have received the link from the file sharer and/or the first user device. The file sharer may receive the request for the file as described in connection with reference number 145 of FIG. 1C.

As shown by reference number 275, the cloud database may transmit, and the file sharer may receive, an indication of the expiry time. For example, the file sharer may receive the indication of the expiry time as described in connection with reference number 175 of FIG. 1F.

As shown by reference number 280, the file sharer may determine that the expiry time has occurred. For example, the file sharer may determine that the expiry time has occurred as described in connection with reference number 180 of FIG. 1F.

As shown by reference number 285, the file sharer may transmit, and the third user device may receive, a rejection of the request for the file. Accordingly, the file sharer may decline the request based on determining that the expiry time has occurred. Additionally, or alternatively, the file sharer may transmit, and the cloud storage may receive, a command to delete the encrypted file, in response to determining that the expiry time has occurred, as described in connection with FIG. 1F. In a combinatory example, the file sharer may terminate access to the file in response to an initial request from a third user device after the expiry time has occurred and may transmit the command after terminating access.

By using techniques as described in connection with FIGS. 2A-2E, the file sharer encrypts the file independently of the cloud storage. As a result, memory overhead is reduced as compared with directly sharing files between the first user device and the second user device, and security is improved as compared with using custodial cloud storages because the cloud storage is unable to decrypt the encrypted file. The file sharer further increases security by denying access to the encrypted file after expiry. Additionally, the file sharer further increases security by authenticating the user of the second user device via the SSO service. Because the SSO service is accessed separately from the cloud storage, a bad actor with access to the cloud storage cannot modify a response from the SSO service in order to gain access to the encrypted file.

As indicated above, FIGS. 2A-2E are provided as an example. Other examples may differ from what is described with regard to FIGS. 2A-2E. For example, the first user device may refrain from transmitting an indication of an expiry time. As a result, the file sharer may continue sharing the file (e.g., as described in connection with FIG. 2D) until receiving a command to stop sharing the file (e.g., from the first user device or from another device used by an owner of the encrypted file). Additionally, or alternatively, the file sharer may use encryption by the cloud storage in combination with the file sharer's own encryption. For example, the cloud storage may apply its own encryption to the uploaded file such that the file is double-encrypted while stored on the cloud storage. Accordingly, both the cloud storage and the file sharer perform decryption before delivering the file to the second user device. Additionally, or alternatively, the file sharer may use authentication by the cloud storage in combination with the file sharer's own authentication. For example, the cloud storage may authenticate the user of the second user device before delivering a copy of the encrypted file. Accordingly, both the cloud storage and the file sharer perform authentication before the file is received by the second user device.

Figure 3:
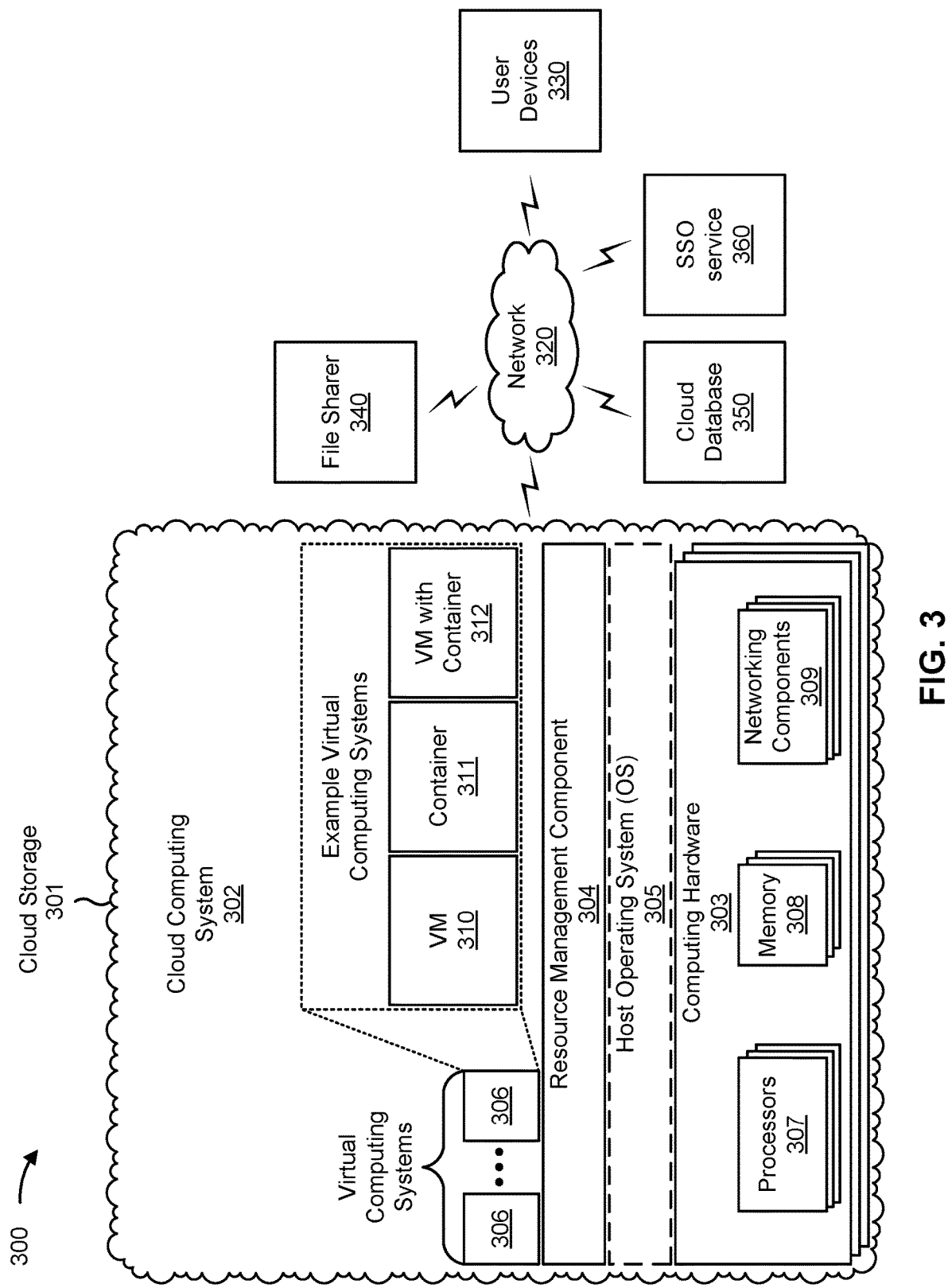
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a cloud storage 301, which may include one or more elements of and/or may execute within a cloud computing system 302. The cloud computing system 302 may include one or more elements 303-312, as described in more detail below. As further shown in FIG. 3, environment 300 may include a network 320, user devices 330, a file sharer 340, a cloud database 350, and/or an SSO service 360. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the cloud storage 301 may include one or more elements 303-312 of the cloud computing system 302, may execute within the cloud computing system 302, and/or may be hosted within the cloud computing system 302, in some implementations, the cloud storage 301 may not be cloud-based (e.g., may be implemented outside of a cloud computing system) or may be partially cloud-based. For example, the cloud storage 301 may include one or more devices that are not part of the cloud computing system 302, such as device 400 of FIG. 4, which may include a stand-alone server or another type of computing device. The cloud storage 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user devices 330 may include a plurality of devices capable of receiving, generating, storing, processing, and/or providing information associated with files, as described elsewhere herein. The user devices 330 may include a communication device and/or a computing device. For example, the user devices 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), and/or a similar type of device. The user devices 330 may communicate with one or more other devices of environment 300, as described elsewhere herein.

The file sharer 340 may include one or more devices capable of receiving, generating, storing, processing, providing, and/or routing information associated with files, as described elsewhere herein. The file sharer 340 may include a communication device and/or a computing device. For example, the file sharer 340 may include a server, such as an application server, a client server, a web server, a database server, a host server, a proxy server, a virtual server (e.g., executing on computing hardware), or a server in a cloud computing system. In some implementations, the file sharer 340 may include computing hardware used in a cloud computing environment. The file sharer 340 may communicate with one or more other devices of environment 300, as described elsewhere herein. Additionally, or alternatively, the file sharer 340 may include a software application (or a software stack) executed by the user devices 330.

The cloud database 350 may be implemented on one or more devices capable of receiving, generating, storing, processing, and/or providing information associated with metadata, as described elsewhere herein. The cloud database 350 may be implemented on a communication device and/or a computing device. For example, the cloud database 350 be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The cloud database 350 may communicate with one or more other devices of environment 300, as described elsewhere herein.

The SSO service 360 may be provided by one or more devices capable of receiving, generating, storing, processing, providing, and/or routing information associated with user authentication, as described elsewhere herein. The SSO service 360 may be provided by a communication device and/or a computing device. For example, the SSO service 360 may be provided by a server, such as an application server, a client server, a web server, a database server, a host server, a proxy server, a virtual server (e.g., executing on computing hardware), or a server in a cloud computing system. In some implementations, the SSO service 360 may be provided by computing hardware used in a cloud computing environment. The SSO service 360 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
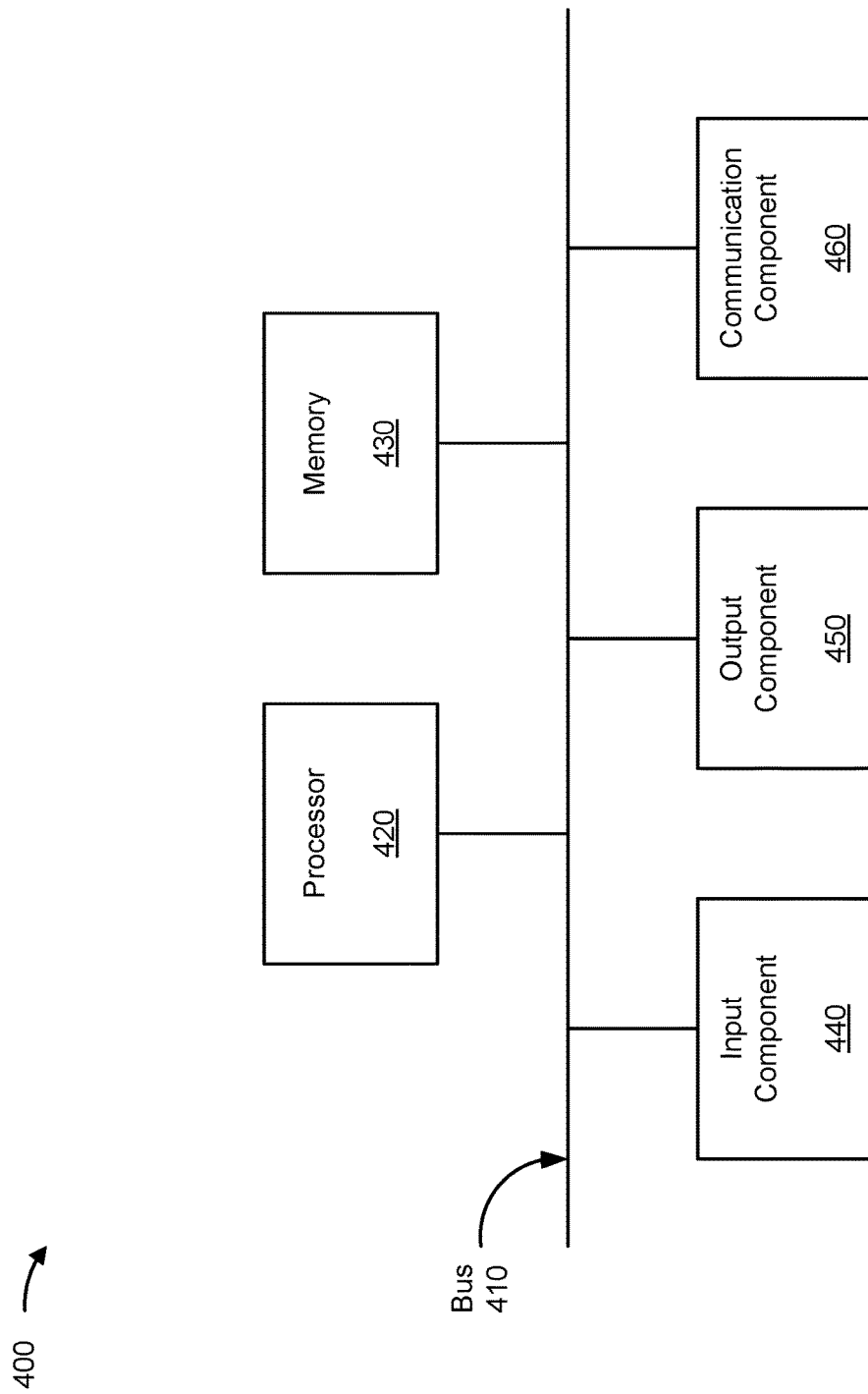
FIG. 4 is a diagram of example components of one or more devices of FIG. 3, in accordance with some embodiments of the present disclosure.

FIG. 4 is a diagram of example components of a device 400 associated with secure file sharing and deletion. The device 400 may correspond to a user device 330, a file sharer 340, a device implementing a cloud database 350, and/or a device providing an SSO service 360. In some implementations, the user device 330, the file sharer 340, the device implementing the cloud database 350, and/or the device providing the SSO service 360 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include RAM, read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
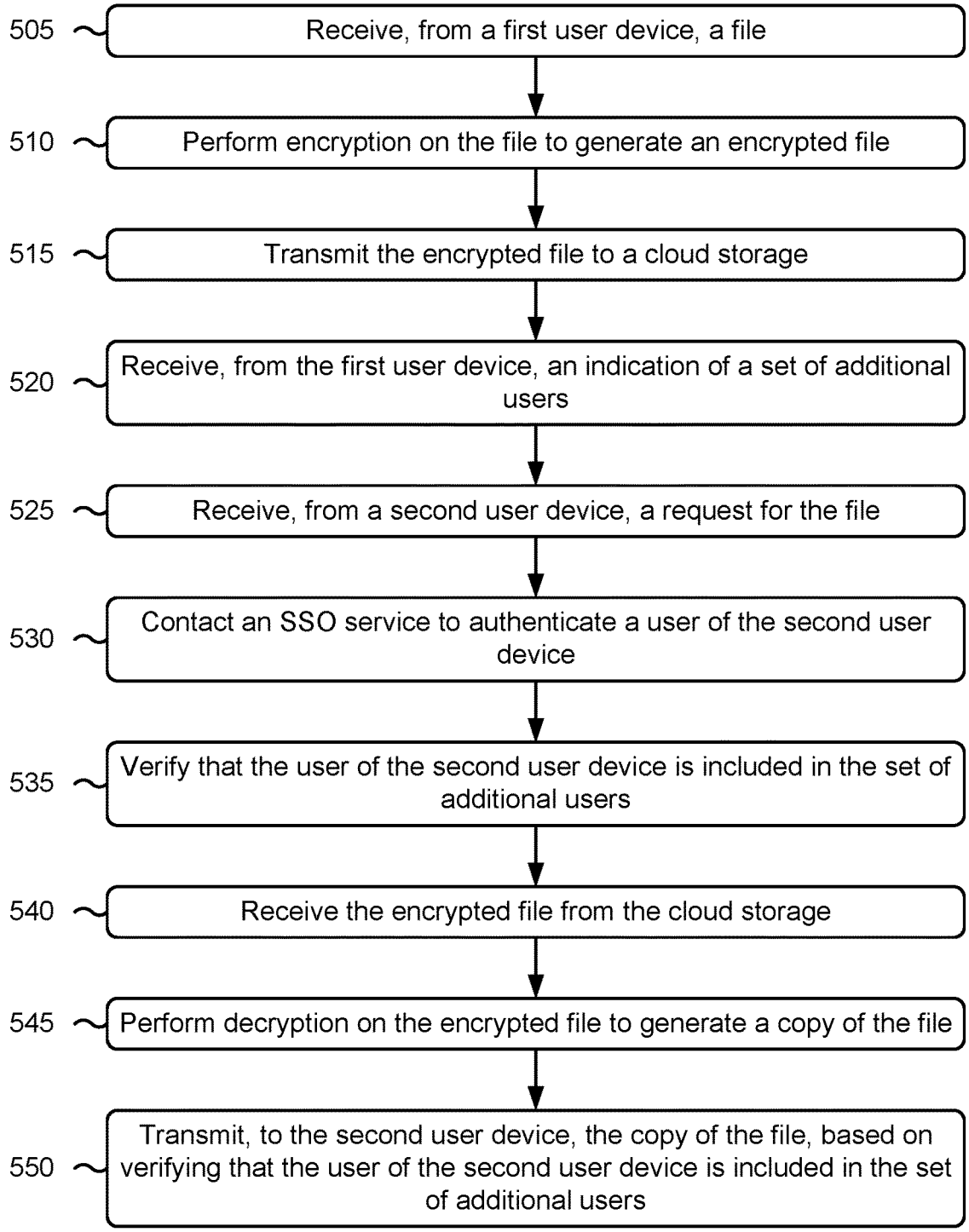
FIG. 5 is a flowchart of an example process relating to secure file sharing and deletion, in accordance with some embodiments of the present disclosure.

FIG. 5 is a flowchart of an example process 500 associated with secure file sharing and deletion. In some implementations, one or more process blocks of FIG. 5 may be performed by the file sharer 340. In some implementations, one or more process blocks of FIG. 5 may be performed by another device or a group of devices separate from or including the file sharer 340, such as the cloud storage 301, the user device 330, the file sharer 340, a device implementing the cloud database 350, and/or a device providing the SSO service 360 Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, from a first user device, a file (block 505). For example, the file sharer 340 (e.g., using processor 420, memory 430, input component 440, and/or communication component 460) may receive, from a first user device, a file, as described above in connection with reference number 105 of FIG. 1A. As an example, the first user device may indicate a file path associated with the file to the file sharer 340 or may upload the file to the file sharer 340.

As further shown in FIG. 5, process 500 may include performing encryption on the file to generate an encrypted file (block 510). For example, the file sharer 340 (e.g., using processor 420 and/or memory 430) may perform encryption on the file to generate an encrypted file, as described above in connection with reference number 115 of FIG. 1B. As an example, the file sharer 340 may use a password, a private key, or another type of information used to convert the file from plaintext into ciphertext. The file sharer 340 may select the information randomly (or at least quasi-randomly based on pseudo-random number generation) in order to improve security. Alternatively, the file sharer 340 may use a secret received from the first user device.

As further shown in FIG. 5, process 500 may include transmitting the encrypted file to a cloud storage (block 515). For example, the file sharer 340 (e.g., using processor 420, memory 430, and/or communication component 460) may transmit the encrypted file to a cloud storage, as described above in connection with reference number 120 of FIG. 1B. As an example, the file sharer 340 may transmit a message (e.g., an HTTP message or an FTP message) including the file in a body of the message and/or may perform a call to an API function including the file as a parameter.

As further shown in FIG. 5, process 500 may include receiving, from the first user device, an indication of a set of additional users (block 520). For example, the file sharer 340 (e.g., using processor 420, memory 430, input component 440, and/or communication component 460) may receive, from the first user device, an indication of a set of additional users, as described above in connection with reference number 110 of FIG. 1A. As an example, the set of additional users may indicate which users are allowed to access the file.

As further shown in FIG. 5, process 500 may include receiving, from a second user device, a request for the file (block 525). For example, the file sharer 340 (e.g., using processor 420, memory 430, input component 440, and/or communication component 460) may receive, from a second user device, a request for the file, as described above in connection with reference number 145 of FIG. 1C. As an example, the second user device may transmit a message (e.g., an HTTP message or an FTP message) indicating the file (e.g., in a body and/or in a header of the message) and/or may perform a call to an API function and indicate the file in a parameter.

As further shown in FIG. 5, process 500 may include contacting an SSO service to authenticate a user of the second user device (block 530). For example, the file sharer 340 (e.g., using processor 420 and/or memory 430) may contact an SSO service to authenticate a user of the second user device, as described above in connection with reference number 150 of FIG. 1D. As an example, the file sharer 340 may verify a secret provided by the second user device (e.g., a token, a certificate, a signature, a key, or another type of information that can authenticate a user) using the SSO service. The file sharer 340 may transmit a message (e.g., an HTTP message) including the secret and/or perform a call to an API function including the secret as a parameter, and the file sharer 340 may receive from the SSO service an indication of whether the user is authenticated.

As further shown in FIG. 5, process 500 may include verifying that the user of the second user device is included in the set of additional users (block 535). For example, the file sharer 340 (e.g., using processor 420 and/or memory 430) may verify that the user of the second user device is included in the set of additional users, as described above in connection with reference number 155 of FIG. 1D. As an example, the file sharer 340 may determine that a username, an email address, or another type of identifier, associated with the user, is included on a list of identifiers associated with the set of additional users.

As further shown in FIG. 5, process 500 may include receiving the encrypted file from the cloud storage (block 540). For example, the file sharer 340 (e.g., using processor 420, memory 430, input component 440, and/or communication component 460) may receive the encrypted file from the cloud storage, as described above in connection with reference number 160 of FIG. 1E. As an example, the file sharer 340 may transmit a message (e.g., an HTTP request) indicating the file (e.g., including a file name or another type of indication in a header or in a body of the message) or may perform a call to an API function indicating the file in a parameter (e.g., using a file name or another type of indication).

As further shown in FIG. 5, process 500 may include performing decryption on the encrypted file to generate a copy of the file (block 545). For example, the file sharer 340 (e.g., using processor 420 and/or memory 430) may perform decryption on the encrypted file to generate a copy of the file, as described above in connection with reference number 165 of FIG. 1E. As an example, the file sharer 340 may convert the encrypted file from ciphertext into plaintext.

As further shown in FIG. 5, process 500 may include transmitting, to the second user device, the copy of the file, based on verifying that the user of the second user device is included in the set of additional users (block 550). For example, the file sharer 340 (e.g., using processor 420, memory 430, and/or communication component 460) may transmit, to the second user device, the copy of the file, based on verifying that the user of the second user device is included in the set of additional users, as described above in connection with reference number 170 of FIG. 1E. As an example, the copy of the file may be included in a message (e.g., an HTTP message) and/or transmitted as a return to a call, performed by the second user device, to an API function associated with the file sharer 340.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F and/or FIGS. 2A-2E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for securely sharing and deleting files, the system comprising:
one or more memories; and
one or more processors, communicatively coupled to the one or more memories, configured to:
receive, from a first user device, a file;
perform encryption on the file, based on a secret received from the first user device, to generate an encrypted file;
transmit the encrypted file to a cloud storage;
transmit, to the first user device, a link to the encrypted file;

receive, from the first user device, an indication of a set of additional users and an indication of an expiry time;

receive, from a second user device, a request for the file;

contact a single sign on (SSO) service to authenticate a user of the second user device;

verify that the user of the second user device is included in the set of additional users;

receive the encrypted file from the cloud storage;

perform decryption on the encrypted file to generate a copy of the file;

transmit, to the second user device, the copy of the file, based on verifying that the user of the second user device is included in the set of additional users;

determine that the expiry time has occurred; and transmit a command, to the cloud storage, to delete the encrypted file.

2. The system of claim 1, wherein the one or more processors are configured to:

discard the file after generating the encrypted file; and discard the copy of the file after transmitting the copy to the second user device.

3. The system of claim 1, wherein the one or more processors are configured to:

transmit an alert to a set of devices associated with the set of additional users.

4. The system of claim 1, wherein the secret received from the first user device comprises a password or a private key.

5. The system of claim 1, wherein the system is local to the first user device and the second user device.

6. The system of claim 1, wherein the system is cloud-based and is separate from the cloud storage.

7. A method of securely sharing and deleting files, comprising:

receiving, from a first user device, a file;

performing encryption on the file to generate an encrypted file;

transmitting the encrypted file to a cloud storage;

receiving, from the first user device, an indication of a set of additional users;

receiving, from a second user device, a request for the file;

contacting a single sign on (SSO) service to authenticate a user of the second user device;

verifying that the user of the second user device is included in the set of additional users;

receiving the encrypted file from the cloud storage;

performing decryption on the encrypted file to generate a copy of the file; and transmitting, to the second user device, the copy of the file, based on verifying that the user of the second user device is included in the set of additional users.

8. The method of claim 7, wherein the file and the indication of the set of additional users are included in a single message.

9. The method of claim 7, further comprising:

transmitting, from a first local instance executed by the first user device and to a second local instance executed by the second user device, a secret for decrypting the encrypted file.

10. The method of claim 7, wherein receiving the request for the file comprises:

receiving the request based on a link to the encrypted file that was provided to the first user device.

11. The method of claim 7, wherein verifying that the user of the second user device is included in the set of additional users comprises at least one of:

determining that a username, associated with the user, is included on a list of usernames associated with the set of additional users; or determining that an email address, associated with the user, is included on a list of email addresses associated with the set of additional users.

12. The method of claim 7, wherein transmitting, to the second user device, the copy of the file comprises:

storing, in a memory of the second user device, the copy of the file.

13. The method of claim 7, wherein transmitting, to the second user device, the copy of the file comprises:

transmitting the copy of the file using at least one network.

14. A non-transitory computer-readable medium storing a set of instructions for securely sharing and deleting files, the set of instructions comprising:

one or more instructions that, when executed by one or more processors of a device, cause the device to:

receive, from a first user device, a file;

perform encryption on the file, based on a secret received from the first user device, to generate an encrypted file;

transmit the encrypted file to a cloud storage;

transmit, to the first user device, a link to the encrypted file;

receive, from the first user device, an indication of an expiry time;

receive, from a second user device, a request for the file;

verify that the second user device transmitted the request for the file via the link to the encrypted file;

receive the encrypted file from the cloud storage;

perform decryption on the encrypted file to generate a copy of the file;

transmit, to the second user device, the copy of the file, based on verifying that the second user device transmitted the request via the link;

determine that the expiry time has occurred; and transmit a command, to the cloud storage, to delete the encrypted file.

15. The non-transitory computer-readable medium of claim 14, wherein the one or more instructions, when executed by the one or more processors, further cause the device to:

transmit the expiry time to a cloud database, wherein the one or more instructions, that cause the device to determine that the expiry time has occurred, cause the device to receive the expiry time from the cloud database and verify that a current time is after the expiry time.

16. The non-transitory computer-readable medium of claim 15, wherein the one or more instructions, that cause the device to transmit the command to delete the encrypted file, cause the device to:

transmit a set of commands, including the command to delete the encrypted file, based on a set of expiry times, including the expiry time, in the cloud database that have occurred.

17. The non-transitory computer-readable medium of claim 14, wherein the one or more instructions, when executed by the one or more processors, further cause the device to:

receive, from the first user device, an indication of a set of additional users;

transmit the indication of the set of additional users to a cloud database; and verify that the user of the second user device is included in the set of additional users on the cloud database.

18. The non-transitory computer-readable medium of claim 14, wherein the request for the file comprises a hypertext transfer protocol message or a file transfer protocol message.

19. The non-transitory computer-readable medium of claim 14, wherein the one or more instructions, when executed by the one or more processors, further cause the device to:

generate the link to the encrypted file based on a longer link provided by the cloud storage.

20. The non-transitory computer-readable medium of claim 14, wherein the one or more instructions, when executed by the one or more processors, further cause the device to:

receive, from a third user device, an additional request for the file; and decline the additional request based on the expiry time having occurred.

\* \* \* \* \*